April 2, 1940.    H. C. SCHILDMEIER    2,196,031
WHEEL BALANCER
Filed July 26, 1937    2 Sheets-Sheet 1
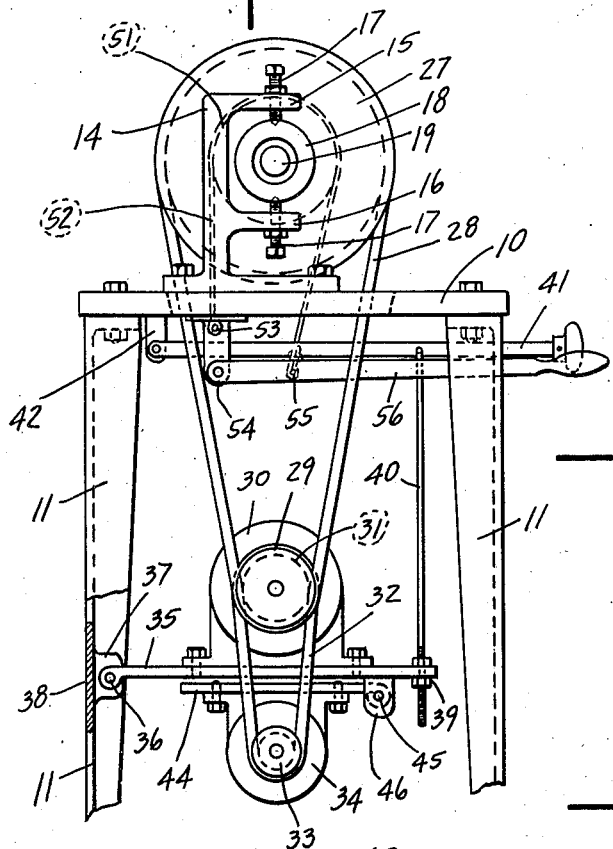
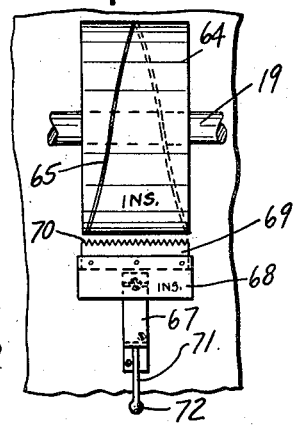
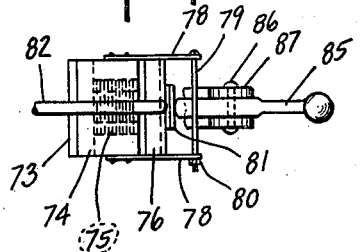
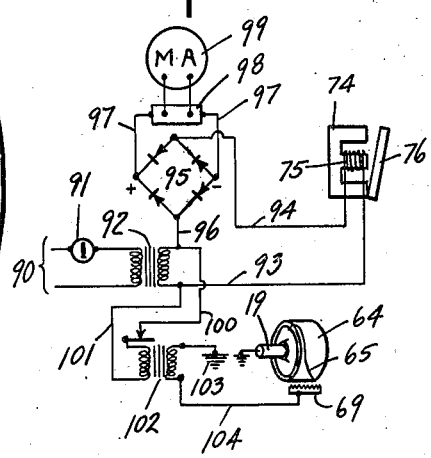
INVENTOR.
HENRY C. SCHILDMEIER.
BY Lockwood, Goldsmith & Galt
ATTORNEYS.

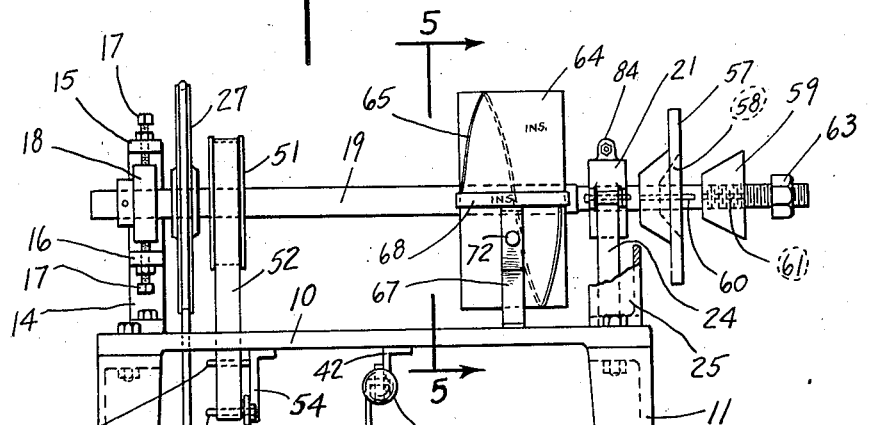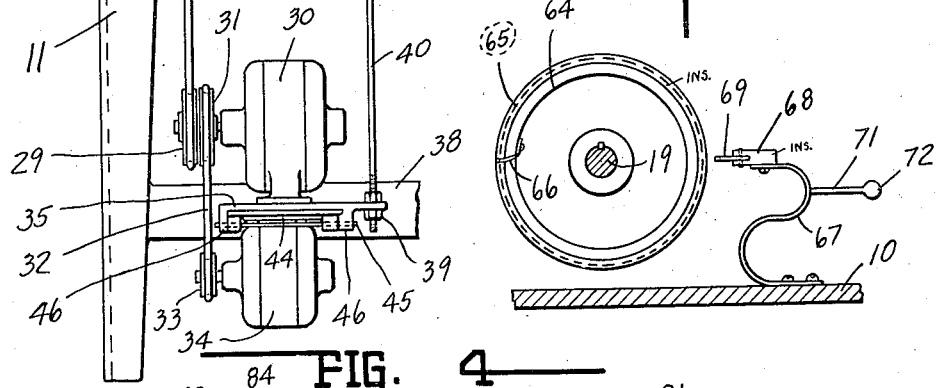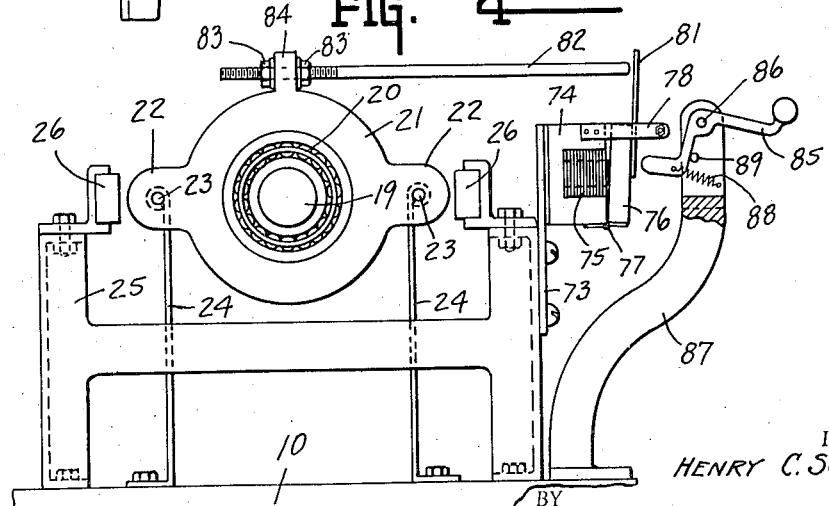

Patented Apr. 2, 1940

2,196,031

UNITED STATES PATENT OFFICE 2,196,031

WHEEL BALANCER

Henry C. Schildmeier, Indianapolis, Ind.

Application July 26, 1937, Serial No. 155,681

7 Claims. (Cl. 73—53)

This invention relates to a balancing machine which is particularly useful in balancing wheels and brake drums of automobiles but is equally useful for the balancing of rotating parts of other types of machinery.

In the balancing of a rotating element, it is usual practice to add weights to the element in the proper amount and proper position to counter-balance such excessive weight as there may be in other parts of the element. It is necessary, therefore, that an efficient balancing machine should promptly indicate both the amount and position of the weight to be added. The principal object of the present invention is to provide a balancing machine which gives this necessary information with a high degree of accuracy and speed.

Other objects of the invention and the manner in which these objects are attained will be apparent from the following specification and claims and the accompanying drawings in which a preferred form thereof is illustrated in detail.

Fig. 1 is a perspective view of the balancing machine with an automobile wheel and tire attached thereto for balancing. Fig. 2 is an end view of the left end thereof with an enclosing casing removed to show the interior construction in detail. Fig. 3 is a front view with the casing removed and with parts cut away. Fig. 4 is a similar view on a large scale of a portion of the right end of the machine with parts removed. Fig. 5 is a fragmentary sectional view taken substantially on the line 5—5 of Fig. 3. Fig. 6 is a fragmentary plan view of a portion of the machine. Fig. 7 is a second fragmentary plan view of another portion of the machine. Fig. 8 is a diagram of wiring connections used for certain electrical parts thereof.

In the form of the invention shown in the drawings by way of illustration, the stationary frame of the machine consists of a deck plate 10 supported by four vertical legs 11 positioned on the four corners thereof. The lower portion of the machine is enclosed by a removable housing 12, and the upper portion by a second removable housing 13. In the drawings, with the exception of Fig. 1, the housings 12 and 13 are removed to show other parts in detail.

On the upper surface of the deck plate 10 there is provided a rigid bearing bracket 14 having horizontal arms 15 and 16. Each of said arms carries an adjustable screw 17 and the ends of said screws pivotally support a bearing 18. Said bearing rotatably supports one end of a horizontal shaft 19. The bearing 18 is preferably of the ball type.

The opposite end of said shaft is carried by a ball bearing 20 contained within a housing 21. The housing 21 is provided with ears 22 to which there are pivotally secured, by means of pins 23, a pair of vertical supports 24 preferably formed of spring steel. The lower ends of the supports 24 are secured to the deck plate 10. By means of this construction, the shaft 19 is free to vibrate horizontally about a pivot formed by the ends of the screws 17. A frame member 25 supported by the deck plate 10 carries bumpers 26, preferably of soft rubber or other resilient substance, in position to engage the ears 22 and to resiliently limit the amplitude of said vibration.

Adjacent the bearing 18 the shaft 19 carries a pulley 27 which may be driven by a belt 28 from a pulley 29 mounted upon the shaft of a motor 30. The belt 28 passes through suitable openings in the deck plate 10. The shaft of the motor 30 carries a second pulley 31 about which there is trained a belt 32 which also passes over a pulley 33 carried by the shaft of a motor 34. The motor 30 is mounted upon a plate 35 pivotally supported by means of a rod 36 and ears 37 upon a cross bar 38 extending between the rear pair of legs 11. The opposite end of the plate 35 is supported upon a nut 39 threadedly engaged with a vertical rod 40, the upper end of which is connected to a clutch lever 41. Said clutch lever is pivotally mounted upon a lug 42 secured to the under surface of the deck plate 10. The opposite end of said lever operates in a hook shaped slot 43 in the housing 12, best seen in Fig. 1.

The motor 34 is mounted on a plate 44 pivotally mounted at one edge by means of a rod 45 and lugs 46 on the under surface of the plate 35. A portion of the weight of the motor 34 and plate 44 is carried by the belt 32 and thus maintains the necessary tension on said belt for the motor 34 to drive the same. When the clutch lever 41 is permitted to rest in the elongated lower portion 47 of the slot 43, the weight of both motors and both plates 35 and 44 is carried in part by the belt 28 and thus maintains the proper tension in said belt to permit either of said motors to rotate the shaft 19. When the lever 41 is manually moved upward and placed in the shorter upper portion 48 of the slot 43, the tension on the belt 28 is relaxed to the point where the shaft 19 will not be rotated.

One of the motors is adapted to drive the shaft at a higher speed than the other, the motor 30 preferably being the high speed motor and the motor 34 being the low speed motor. If desired, one of said motors may be of a variable speed type to provide a greater range of speed for the shaft 19. Ordinarily, however, it is only necessary to have one low speed for the balancing operation and one higher speed for checking the balance when the operation is complete. Power for said motors is controlled by means of snap switches 49 and 50 carried by the housing 13. The wiring of these motors may be of a standard type and need not be shown in detail.

Adjacent the pulley 27 the shaft 19 carries a brake drum 51 about which there is trained a brake band 52. One end of said brake band extends through a suitable opening in the deck plate 10 and is anchored at 53 to a lug 54 formed on the lower surface of the deck plate 10. The opposite end of said brake band is anchored at 55 to a brake lever 56 which is pivotally mounted to the lug 54 and extends outwardly through a suitable opening in the casing 12. The weight of the lever 56 is insufficient to apply an appreciable braking pressure to the drum 51. However, a manual downward pressure on the lever 56 provides sufficient braking pressure to bring the shaft 19 to a rapid stop when the power has been cut from the motors 30 and 34 or the clutch lever 41 has been operated to slacken tension on the belt 28.

Outside of the bearing 20 the shaft 19 carries a face plate 57 keyed thereto. Said face plate has a central recess 58 and may be provided with suitable recesses in the face thereof to receive such projections as there may be on the elements to be balanced by the machine. A cone 59 is slidably mounted on the shaft 19 and when moved close to the face plate 57 engages a spline 60 mating with a keyway 61 therein which adequately prevents rotation of the cone. In mounting the wheel 62 or other element to be balanced, the cone is removed, the wheel placed in position against the face plate 57 and the cone is then replaced and engages the central hole in the wheel. The whole structure is locked in place by a nut 63 which threadedly engages the shaft 19 and may be turned against the outer surface of the cone 59.

To the left of the bearing housing 21 the shaft 19 carries a cylindrical drum 64, the outer surface of which is preferably formed of insulating material. For this purpose, a wood or paper faced pulley may be used. An electric conductor 65 is inset in a helical groove formed in the outer surface of the drum 64 and is electrically connected by a wire 66 with a metallic portion of the drum 64 which is in electrical contact with the shaft 19. If desired, the drum may be entirely metallic, the conductor 65 being made in the form of an upraised helical fin.

Adjacent the drum 64, an S-shaped member 67, preferably of spring steel, is mounted upon the deck plate 10 and carries on its upper face an insulation block 68 on which there is mounted a conductor 69 having its inner edge generally parallel to the axis of the shaft 19 and the face of the drum 64. Preferably the conductor 69 is in the form of a serrated member or comb having a plurality of teeth 70 projecting toward the drum 64. A rod 71 carrying a knob 72 is secured to the S-shaped spring 67 and projects through a suitable opening in the housing 13. Said knob may be pressed to move the teeth 70 closer to the drum 64 and when released permits the same to be moved by the spring 67 away from said drum.

The frame member 25 has secured thereto a vertical member 73 to which is secured an E-shaped magnetic core 74. A reactance coil 75 is wound about the central stem of the core 74 and an armature 76 is hinged to said core at 77. Adjacent the upper edge of the core 74 there are secured a pair of leaf springs 78 secured together by a bolt 79, the effective length of which may be adjusted by a nut 80. The springs 78 engage the edges of the armature 76 and frictionally retain the same in any position in which it may be placed by other means. An extension 81 is secured to the armature 76 and is arranged in the path of travel of a stem 82 adjustably secured by means of nuts 83 to a lug 84 formed on the bearing housing 21. By this means the horizontal vibrations of the shaft 19 are transmitted to the stem 82. The stem 82 striking the extension 81 moves the same and the armature 76 outwardly a distance proportional to the amplitude of the vibrations. The armature is retained in this position by means of the springs 78 until it is manually reset by means of a lever 85. Said lever is pivotally mounted at 86 on the upper end of a bracket 87 supported on the deck plate 10. One end thereof is in position to engage the armature 76 to press the same into an initial position against the core 74 and the opposite end of said lever extends through a suitable opening in the housing 13 on the side not visible in Fig. 1. A tension spring 88 normally retains the lever 85 against a stop pin 89 out of engagement with the armature 76.

In Fig. 8 there is shown a diagram of a preferred form of electrical connection in which power is supplied on a pair of power mains 90 in one of which there is indicated a snap switch 91. The power mains 90 may be connected to any suitable source of alternating current, preferably 110 volt, 60 cycle. The mains 90 are connected through the switch 91 to the primary windings of a transformer 92, one terminal of the secondary winding of which is connected by means of a conductor 93 to one terminal of the coil 75. The opposite terminal of the coil 75 is connected by a conductor 94 to one of the alternating current terminals of a rectifier 95, the opposite alternating current terminal of which is connected by a conductor 96 to the second terminal of the secondary winding of transformer 92. The direct current terminals of the rectifier 95 are connected by conductors 97 to a shunt 98 to which there is connected a milliammeter 99.

The transformer 92 delivers alternating current at a voltage to suit the characteristics of the coils 75, rectifier 95 and the milliammeter 99. When switch 91 is closed, current is drawn from the transformer secondary through the circuit 92, 93, 75, 94, 95, 96, 92 and the amount of said current depends upon the inductance of the coil 75 which in turn depends upon the position of the armature 76 with relation to the core 74. The amount of this current is indicated by the milliammeter 99.

There is also connected to the secondary windings of transformer 92, by means of conductors 100 and 101, a high tension induction coil 102, preferably of the vibrating make-and-break type. Induction coil 102 has one of its secondary terminals grounded at 103 on the frame of the machine. Since the conductor 65 is grounded through the metallic portion of drum 64 and shaft 19, there is in effect an electric connection between said conductor and said secondary terminal. The opposite secondary terminal of coil 102 is connected by a conductor 104 to the comb 69. By this wiring there is formed a high tension circuit (102, 104, 69, 65, 19, 103, 102) which has an air gap between the comb 69 and the conductor 65. The voltage delivered by the coil 102 is sufficient to cause a spark to jump between the conductor 65 and the nearest of the teeth 70. In the rotation of the drum 64 sparks are successively discharged between each of said teeth and the conductor 65. At any given instant the position of the spark discharge on the comb 69 indicates the instantaneous angular position of the shaft in its rotation. When said drum is rapidly rotated, sparks are discharged in such rapid succession as to give the impression of a row of continuous discharges which are visible through an opening 105 in the housing 13.

In the operation of the apparatus, a wheel 62 or other element to be balanced is secured to the shaft 19. Armature 76 is set in its initial position against core 74 by means of lever 85. The switch 91 is closed and the low speed motor 34 is started. The clutch lever 41 is then operated to start rotation of the shaft 19 and the wheel carried thereby. If the wheel is out of balance, the shaft 19 vibrates horizontally about the ends of the bolts 17 and the amplitude of this vibration is a measure of the weight which must be added to balance the wheel. The vibration is transmitted to the stem 82 which strikes the armature extension 81 and thus places the armature 76 in a position corresponding to the said amplitude. The current flowing through the coil 75 is affected by the position of the armature and this effect is indicated by the milliammeter 99. For a given diameter of wheel, the amplitude of vibration is a direct measure of the amount of weight which must be added at the rim of the wheel to balance the same. Therefore, the scale of the milliammeter may be constructed to read directly the amount of weight to be added for a wheel of a certain size. The meter, of course, may carry several scales calibrated for several sizes of wheels. On each of these scales, the point marked "Zero" will correspond to the current flowing through the meter when the armature 76 has been placed in its initial position resting against the core 74.

As the shaft 19 rotates with an unbalanced wheel secured thereto, the horizontal vibrations have the same frequency as the rotation. For that reason, one particular point on the periphery of drum 64 approaches closer to the comb 69 at each revolution than any other point of said drum. The location of this point is determined by the position of the unbalanced weight on the wheel. The conductor 65 draws a shorter spark from the tooth of the comb corresponding to this particular point than from any other tooth. Since the rotation of the drum is sufficiently fast for each of the sparks to appear as a continuous discharge, it is easy to compare the lengths of the several sparks and to determine which is the shortest. When once the shortest spark has been located, the machine is stopped and the shaft and wheel are rotated by hand until a spark appears at the previously determined point on the comb 69 at which the shortest spark appeared. The necessary weight as indicated by the milliammeter is then added to the rim of the wheel opposite an index mark 106 on the housing 13. The position of the index mark is determined empirically. It has been found in practice that the position of the added weight varies with the amount of weight to be added for a given size of wheel and also varies with different types and sizes of elements to be balanced. However, when once determined, the position of the index mark holds good for a similar set of conditions. A plurality of such indices suitably labeled are, therefore, provided for varying sizes and types of elements to be balanced and for various amounts of weight to be added.

When the proper amount of weight has been added at the position of the index mark, the low speed motor is stopped and the high speed motor 30 is started to check the final balance. Obviously, the amplitude of vibration for a given amount of unbalance at high speed would be greater than at a low speed but it has been found in practice that in the great majority of cases the high speed check shows practically no vibration when the weight has been added as indicated by the low speed test. If, however, the high speed check shows an appreciable unbalance, the low speed test is repeated to secure a finer adjustment of balance. A tachometer 107 may be mounted on the housing 13 and suitably connected to the shaft 19 to indicate the speed of rotation of the shaft 19. By this means, the high speed check may be made at the actual speed at which the element under test is to operate. When a variable speed motor is not used in this check, it is only necessary to run the high speed motor long enough to bring the shaft 19 to the desired operating speed, even though this speed may be lower than the maximum speed obtainable with the motor. The original low speed balancing operation must, of course, be carried out at a predetermined fixed speed.

From the foregoing specification, it will be obvious that the machine provides for the rapid determination of both the amount and position of the weight to be added after the wheel has been placed in position. The determination of ths information need require but a few seconds. Since the mounting of the object and its removal are very simple, a large number may be balanced in an extremely short time.

The foregoing specification describes a preferred form of the invention the details of which may be varied between wide limits without departing from the scope of the invention as defined in the appended claims. For example, the comb 69 may be formed with a straight edge rather than a serrated edge. In that case, the spark discharge appears as a narrow band giving the appearance of a continuous sheet which has its narrowest point adjacent the portion of conductor 65 which approaches closest to the conductor 69. The serrated form of the member 69 is preferred however since it produces a discharge of greater intensity with less voltage. Another example of a possible variation is that the supports 24 may be suspended from an overhead bridge with bearing housing 21 carried by the lower ends thereof. This is a mere reversal of parts which is preferable for balancing objects of greater weight than can be accommodated when the springs 24 act as columns to carry the weight.

The invention claimed is:
1. In a balancing machine, the combination of a rotatable shaft, on which an element to be balanced may be mounted, means for rotating said shaft, a bearing for said shaft adjacent each end, at least one of said bearings being mounted to permit vibration of said shaft in a direction transverse thereto, a helical electric conductor mounted on said shaft coaxial therewith and rotatable therewith, a relatively stationary serrated conducting member mounted with the line of the teeth thereof substantially parallel to the axis of said shaft and spaced from the path of travel of said helical conductor, and means for producing an electric spark discharge between adjacent portions of said conductors.

2. In a balancing machine, the combination of a rotatable shaft, on which an element to be balanced may be mounted, means for rotating said shaft, a bearing for said shaft adjacent each end, at least one of said bearings being mounted to permit vibration of said shaft in a direction transverse thereto, a helical electric conductor mounted on said shaft coaxial therewith and rotatable therewith, a relatively stationary conductor arranged generally parallel to the axis of said shaft and spaced from the path of travel of said helical conductor, and means for producing an electric spark discharge between adjacent portions of said conductors.

3. In a balancing machine, the combination of a rotatable shaft on which an element to be balanced may be mounted, said shaft having one end resiliently mounted to permit vibration in a direction transverse to the axis of rotation, a helical electric conductor mounted on said shaft coaxial therewith and rotatable therewith, a relatively stationary serrated conducting member mounted with the line of the teeth thereof substantially parallel to the axis of said shaft and spaced from the path of travel of said helical conductor, and means for producing an electric spark discharge between adjacent portions of said conductors.

4. In a balancing machine, the combination of a rotatable shaft on which an element to be balanced may be mounted, said shaft having one end resiliently mounted to permit vibration in a direction transverse to the axis of rotation, a helical electric conductor mounted on said shaft coaxial therewith and rotatable therewith, a relatively stationary conductor arranged generally parallel to the axis of said shaft and spaced from the path of travel of said helical conductor, and means for producing an electric spark discharge between adjacent portions of said conductors.

5. In a balancing machine, the combination of a rotatable shaft on which an element to be balanced may be mounted, said shaft having one end resiliently mounted to permit vibration in a direction transverse to the axis of rotation, an induction coil having a magnetic core and a movable armature, means movable by the vibration of said shaft to move said armature through a distance corresponding to the amplitude of said vibration, a normally closed alternating current electric circuit including said induction coil, the amount of current flowing in said circuit being determined by the position of said armature, and means for measuring said current flow.

6. In a balancing machine, the combination of a rotatable shaft, on which an element to be balanced may be mounted, means for rotating said shaft, a bearing for said shaft adjacent each end, at least one of said bearings being mounted to permit vibration of said shaft in a direction transverse thereto, an induction coil having a magnetic core and a movable armature, means movable by the vibration of said shaft to move said armature through a distance corresponding to the amplitude of said vibration, a normally closed alternating current electric circuit including said induction coil, the amount of current flowing in said circuit being determined by the position of said armature, and means for measuring said current flow.

7. In a balancing machine, the combination of a rotatable shaft on which an element to be balanced may be mounted, said shaft having one end resiliently mounted to permit vibration in a direction transverse to the axis of rotation, an induction coil having a magnetic core and a movable armature, means movable by the vibration of said shaft to move said armature through a distance corresponding to the amplitude of said vibration, means frictionally retaining said armature in the position in which it is placed by said last mentioned means, an electric circuit supplied with alternating current and including said induction coil, and means for measuring the current flowing in said circuit.

HENRY C. SCHILDMEIER.